(12) United States Patent
Kumar et al.

(10) Patent No.: US 9,582,444 B1
(45) Date of Patent: Feb. 28, 2017

(54) SELECTIVE PARTITION BASED REDIRECTION FOR MULTI-PARTITIONED USB DEVICES

(71) Applicant: Dell Products L.P., Round Rock, TX (US)

(72) Inventors: Ankit Kumar, Deoghar (IN); Sharad Patesaria, Asansol (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/955,751

(22) Filed: Dec. 1, 2015

(51) Int. Cl.
*G06F 13/38* (2006.01)
*G06F 3/06* (2006.01)
*G06F 13/40* (2006.01)
*G06F 13/42* (2006.01)

(52) U.S. Cl.
CPC .......... *G06F 13/385* (2013.01); *G06F 3/067* (2013.01); *G06F 3/0619* (2013.01); *G06F 3/0622* (2013.01); *G06F 3/0644* (2013.01); *G06F 3/0665* (2013.01); *G06F 13/4072* (2013.01); *G06F 13/4282* (2013.01)

(58) Field of Classification Search
None
See application file for complete search history.

(56) References Cited

U.S. PATENT DOCUMENTS

2010/0146000 A1* 6/2010 Greggs ................. G06F 13/385
707/792

* cited by examiner

*Primary Examiner* — Scott Sun
(74) *Attorney, Agent, or Firm* — Baker Botts L.L.P.

(57) ABSTRACT

Universal serial bus (USB) devices may be redirected to a server to create USB virtual devices. Each of the USB devices to be redirected may have one or more partitions but each partition may not be suitable for redirection. A user may select one or more partitions for redirection. The server may read the selected partitions. The server will create virtual volumes for only the selected partitions and will mount a file system for each of the selected partitions only.

20 Claims, 6 Drawing Sheets

SELECTIVE PARTITION BASED REDIRECTION FOR MULTI-PARTITIONED USB DEVICES

FIELD

The disclosure relates in general to partition-based redirection, and more particularly to a partitioned based redirection for multi-partitioned universal serial bus (USB) devices such as USB mass storage devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One approach to the design and implementation of information handling systems for computer networks, particularly with regard to the development of client/server applications, includes designing client applications and client terminals so that the majority of the heavily used resources are at a remote computing machine, such as a centralized server, connected via a network. The client terminals generally have minimal memory, disk storage, and processor power, but are designed under the premise that most users connected to a powerful server do not need the additional processing power. With these client terminals, the total cost of ownership is minimized, because of the reduced resources and because the clients can be centrally administered and updated from the server. As such, these client terminals are suited for a network that can handle a significant number of terminals. If the client terminals have devices attached to them, then when the client terminals are connected to the server, not only the client terminals but also the client terminals' devices can become available to the server.

Some information handling systems have externally connected devices, such as universal serial bus (USB) devices. These devices may be redirected from the client to a server. The redirected devices may then be made available to other users connected to the server. Such externally connected devices may contain numerous types of data and may contain data associated with various levels of privacy or security. Also, these externally connected devices may contain large amounts of data that may degrade performance due to bandwidth requirements. Thus, a need exists to allow for selective redirection of one or more partitions of an externally connected device, such as a USB device or a USB mass storage device.

SUMMARY

In one embodiment, redirection information is received from a client, wherein the redirection information comprises one or more selected partitions of a universal serial bus (USB) device coupled to the client. One or more volume mount requests are sent from an input/output (I/O) manager to one or more file system drivers. One or more volume mount requests are intercepted by a file system filter driver. The file system filter driver identifies one or more virtual volumes corresponding to the selected partitions of the USB device. The one or more file systems correspond to each of the one or more identified virtual volumes are mounted. A request to access a first virtual volume associated with the virtual USB device is received.

In one embodiment a virtual disk enumerator creates the virtual USB device. The redirection information comprises one or more of a notification, one or more properties associated with the one or more selected partitions, and identification of the one or more selected partitions. The client notifies that the virtual USB device was successfully created. A request is received from an application, wherein the request is directed to a specific virtual volume. The request is translated to a USB request block and the USB request block is passed to the client. It may be determined if one or more of the one or more selected partitions comprises secure data. It may be determined if an application associated with a request has permission to access the one or more selected partitions comprising secure data. The request is processed based, at least in part, on one or more security permissions associated with the application.

In one embodiment, one or more computer-readable non-transitory storage media embodying software that is operable when executed performs or implements one or more embodiments. In one embodiment, a system comprises one or more processors and a memory coupled to the processors comprising instructions executable by the processors, the processors being operable when executing the instruction to perform or implement one or more embodiments.

DETAILED DESCRIPTION

Figure 1:
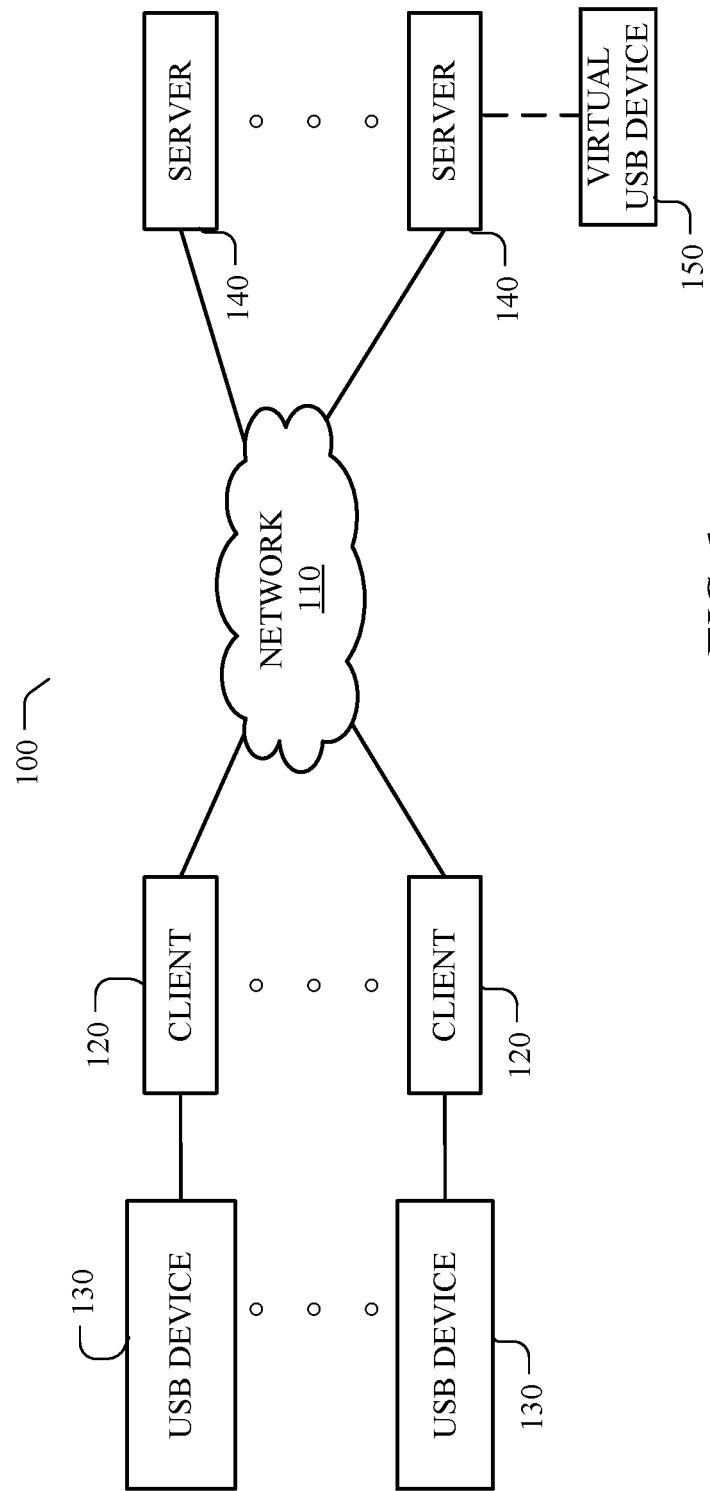
FIG. 1 is a conceptual block diagram of selected elements of an information handling system according to one or more embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Frequently, devices connected to client terminals (also referred to as "clients" or "client-side devices") are virtualized on a server to provide access to the devices from user sessions on the server. For example, a universal serial bus (USB) device, such as a USB mass storage device, may be externally connected to a client. The USB device may be redirected to a server (as a virtual USB device) so that other users or clients connected to the server may access the virtual USB device in the same manner as a locally connected device would be accessed.

The USB devices to be redirected may contain any type of data including data that has privacy or security restrictions. For example, a USB device connected to a client may contain private data or personal information that should not be shared to other clients or users connected to the server. If the USB device is redirected in the traditional manner, all of the private data may be accessible by other users or clients.

Also, USB devices to be redirected may contain large amounts of data. For example, a USB device may contain data associated with a database that is one Terabyte in size. Transmission of such huge amounts of data may affect network performance and consume more than an allotted or available amount of network bandwidth or central processing unit (CPU) resources.

In some instances, a USB device may be partitioned such that certain data, such as private data or portions of a database, may reside in a separate partition from other data stored on the USB device. However, redirecting partitioned USB devices also may require more bandwidth and resources. For example, a file system on the server may need to be loaded which may require a large number of USB request blocks (URB) to be transferred between the client and the server. Every system partition table of the USB device at the client that is redirected to the server must be read to mount it to the server which may reduce network performance and available network bandwidth and may also consume CPU resources at both the client and the server.

Thus, the present invention addresses the problem of redirection of multi-partitioned USB devices by only redirecting those partitions that have been selected for redirection. The server will only mount a file system associated with the selected partition or partitions as opposed to mounting a file system for every partition of a redirected USB device.

In the following description, details are set forth by way of example to facilitate discussion of the disclosed subject matter. It should be apparent to a person of ordinary skill in the art, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices (such as USB mass storage devices), one or more communications ports for communicating with external devices as well as various input and output (I/O) devices, such as a keyboard, a mouse, a wireless device, for example, a Bluetooth device, a video display, and any other device known to one of ordinary skill in the art. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-6, wherein like numbers are used to indicate like and corresponding parts.

FIG. 1 at 100 illustrates an example configuration of a networked information handling system. In particular embodiments, one or more client devices 120 and one or more servers 140 are connected via network 110. Clients 120 may be thin-clients, WebEx clients, or any other type of information handling system as described with respect to FIG. 6. Many types of peripheral devices may be connected locally to the client 120. As shown in FIG. 1, in some embodiments, one or more USB devices 130 connect to client 120. According to the present disclosure, one or more USB devices 130 may appear to one or more of servers 140 as if they are locally installed on and connected to those servers 140. In certain embodiments, these USB devices 130 may be redirected such that they appear to be locally installed or locally shared with another client 120. In one embodiment, the Dell Wyse TCX USB Virtualization is used to virtualize the USB device 130. In one or more embodiments, one or more USB devices 130 may be virtualized (a virtual volume 150) at a server 140.

Network 110 may be a public network or a private (for example, corporate) network. Additionally, network 110 may be, for example, a Local Area Network (LAN), a Wide Area Network (WAN), a wireless network, the Internet, an intranet or any other suitable type of network. One or more client devices 120 may be connected to the network 110 via a network switch (not shown). In particular embodiments, network 110 may include one or more routers for routing data between clients 120 and/or servers 140. A device (for example, a client 120 or a server 140) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (for example, customer sites) or subnets. As an example, a corporate network may include potentially thousands of offices or branches, each with its own subnet (or multiple subnets) having many devices. One or more clients 120 may communicate with one or more servers 140 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client 120 may be a desktop computer, a laptop computer, a tablet computer, a handheld device, a mobile phone, a kiosk, a vending machine, a billboard, or any suitable information handling system 600. In particular embodiments, a client 120 is an embedded computer and may have flash memory (for example, a solid state drive) instead of a hard disk drive. In particular embodiments, a client 120 is a thin client having limited processing capabilities and limited storage, and such a thin client may require minimal management and updates. A client 120 may communicate with a server 140 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

In particular embodiments, a client 120 may connect to a USB device 130. The present invention contemplates client 120 connecting to any number of USB devices 130. Further, the present invention contemplates any number of clients 120 connecting to one or more USB devices 130 such that multiple clients 120 may be connected to one or more unique USB devices 130. In particular embodiments, any number of clients 120 may be connected to the same USB device(s) 130, different USB device(s) 130, or any combination thereof.

A server 140 may include one or more of: a computing device, a desktop computer, a laptop computer, a database, a corporate server, a repository server, a configuration application server, a domain name system (DNS) server, a dynamic host configuration protocol (DHCP) server, a virtual machine (for example, VMware® Virtual Machine), a desktop session (for example, Microsoft Terminal Server), a published application (for example, Microsoft Terminal Server), or any suitable information handling system 600. As an example, a private (for example, corporate) network may include a device manager server and a repository server each configured to communicate with multiple clients 120 across one or more domains, sites, or subnets of network 110. In particular embodiments, a server 140 may include one or more servers, or functions of one or more servers. A client device 120 may access software resources provided by a server 140 such as, for example, operating systems, add-ons, content, or any other suitable data, applications, or images. In particular embodiments, a client 120 may access resources provided by a server 140 only after providing suitable authentication information. Alternatively, a server 140 may provide software or other resources automatically to one or more client 120.

It may be desirable, in the case of a private (for example, corporate) network including multiple sites or subnets to deploy software (including, for example, all or part of one or more operating systems, applications, add-ons, or data) to one or more clients 120 across one or more sites or subnets. The clients 120 may, for example, be located remotely from one or more servers 140 (including, for example, device managers or resource repositories).

In particular embodiments, one or more servers 140 of a network 110 may include a virtual USB device (or virtual volume) 150, such as a USB mass storage device. While the virtual USB device 150 is not locally or physically connected to the server 140, the virtual USB device 150 appears to the server 140 as if it is locally connected to the server 140. Thus, USB device 150 appears to the server 140 as a virtual USB device 150. While only one virtual USB device 150 is shown, the present invention contemplates server 140 virtualizing and accessing any number of virtual USB devices 150 corresponding to any one or more USB devices 130 connected to any one or more clients 120. Further, the present invention contemplates any number of servers 140 accessing one or more virtual USB devices 150 such that multiple servers 140 may access one or more virtual USB devices 150. In particular embodiments, any number of servers 140 may access virtual USB device(s) 150, different virtual USB device(s) 150, or any combination thereof.

As used herein, a "local" device of client 120 or server 140 or a device "locally" connected to client 120 or server 140, may be a device directly connected to the client 120 or server 140 using one or more wires or connectors (for example, physically connected to the system), or a device directly connected to the client 120 or server 140 using a wireless link. For example, USB device 130 is a local device connected using a USB connection to client 120. Furthermore, in one aspect of the disclosure, a local device of client 120 or server or a device locally connected to client 120 or server 140 may include a device within client 120 or server 140.

A "remote" device, or a device "remote" to client 120 or server 140, may be a device that is not directly connected to client 120 or server 140. For example, server 140 is remote to both client 120 and USB device 150 because server 140 is not directly connected to client 120 or USB device 150 but connected indirectly through network 110, which can include, for example, another server 140, or the Internet.

In particular embodiments, client 120 (for example, a thin client, a slim client, or a lean client) or one or more software components associated with client 120 may depend on server 240 to fulfill its computational roles. As an example of a Virtual Desktop Infrastructure (VDI) and not by way of limitation, client 120 may provide one or more terminal services to one or more users of client 120. As such, the users of client 120 may login to the same server 140 and perform tasks on the same server 240 substantially at the same time. In the VDI, one or more USB devices 130 may be connected to client 120. In particular embodiments, in order for the USB devices 130 to work seamlessly, communications associated with the USB devices 130 may be redirected to a Virtual Desktop (VD) operating system (OS) or a Virtual Machine (VM) OS (for example, WINDOWS SERVER 2003) of the VDI.

Figure 2:
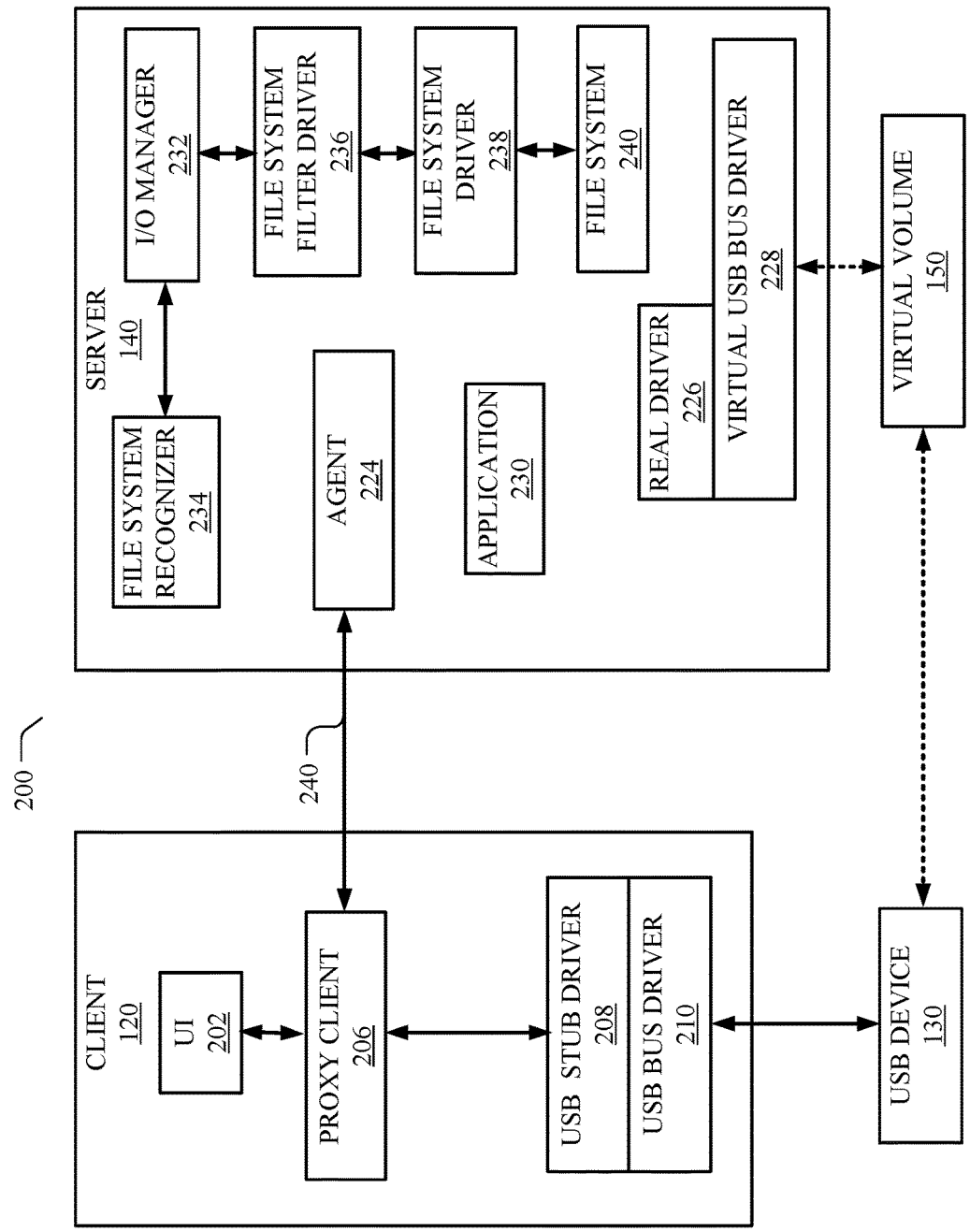
FIG. 2 is a conceptual block diagram of selected elements of a computer network environment according to one or more embodiments of the present disclosure.

FIG. 2 at 200 illustrates an example embodiment of a system configured to redirect a USB device 130 to allow for access to a selected partition or partitions by other enterprise network users, clients 120, or servers 140. In a particular embodiment, the configuration shown in FIG. 2 illustrates a virtual environment that may include one or more of Virtual Desktop Infrastructure (VDI) environment, Server-Based Computing (SBC) environment, and application virtualization technologies. This disclosure contemplates any number of virtual environments as known to one of ordinary skill in the art. As a result of the suitability of these technologies for different user types, many organizations are choosing to implement a hybrid approach that uses each of the technologies including using multiple vendors within each technology. The decision as to which users to allocate to which technology type may be difficult in advance of any actual implementation of a particular technology for a particular user.

Client 120 may include a user interface (UI) 202, proxy client 206, USB stub driver 208, and USB bus driver 210. UI 202 may be within client 120 or may be a UI device 202 coupled to client 120 via any type of connection known to one or ordinary skill in the art. UI 202 is a device for displaying or presenting a selection to a user or another client 120. For example, in one embodiment UI 202 may be a monitor, a display-port monitor, a television, a projector, another client 120 or any other type of device known to one of ordinary skill in the art.

Client 120 may recognize USB device 130, which is connected locally. The client 120 loads the USB bus driver 210. The USB bus driver 210 manages the USB device 130 and converts any generic read and write requests to the appropriate USB request block (URB). The USB bus driver 210 loads the USB stub driver 208. The USB stub driver 208 primarily manages the USB hubs and corresponding ports and enumerates any USB devices 130 connected to these ports. In one embodiment the USB stub driver 208 is a Wyse USB stub driver. USB stub driver 208 communicates to proxy client 206 a request regarding redirection of the USB device 130. If a USB device 130 is configured to be redirected to server 140, the redirection may operate generally as described in U.S. Pat. No. 8,010,630 to Barreto, et al., which is incorporated herein by reference.

UI 202 provides an interface for a user to make one or more selections of one or more partitions of a multi-partitioned USB device 130 to make available to others, such as other users, other clients 120, or other servers 140, or to redirect to server 140 as a virtual USB device 150. In one embodiment, the UI 202 may allow a user to select more than one partition of USB device 130 for redirection. In one embodiment, the UI 202 allows the user to select whether to enable partition-based redirection for a given client 120, for a given USB device 130, or any combination thereof. For example, a user, such as an administrator or another client 120, may determine to make available for redirection one or more partitions of one or more USB devices 130 based, at least in part, on one or more criteria. The criteria or parameters may include any one or more of type, version, storage capacity, manufacturer identification, vendor identification, number of partitions and any other criteria of USB device 130 known to one of ordinary skill in the art.

Client 120 and server 140 may communicate via proxy client 206 and agent 224 over a network 110 (shown in FIG. 1) via a websocket 240. In one embodiment, a proxy client 206 on client 120 may coordinate communications between USB device 130 and agent 224 running on server 140. For example, proxy client 206 may be configured to receive socket connection information over websocket 240 from server 140 and initiate redirecting I/O transactions between USB device 130 and agent 224 via proxy client 206. Agent 224 may be configured to register with the OS of the client 120 to receive notification of an establishment of any remote connection. In one embodiment, client proxy client 206 sends to agent 224 one or more redirection parameters or information related to USB device 130 that may be used, at least in part, to initialize virtual USB device 150. For example, proxy client 206 may send to agent 224 the selected partitions for redirection, USB version, vendor type, device type, or any other parameter known to one of ordinary skill in the art.

The agent 224 on server 140 passes the details of the received one or more redirection parameters to the Virtual USB bus driver 228. Thus, the Virtual USB bus driver 228 receives information about the selected partitions USB device 130 that is to be redirected from agent 224 of the server 140. In one embodiment, virtual USB bus driver 228 may be a Wyse virtual USB bus driver wvusbbus.sys. Virtual USB bus driver 228 calls real driver 226, associated with the USB device 130, to complete the initialization of the USB device 130 on server 140. The selected partitions are extracted and a file system is mounted only for each selected partition.

Mounting a virtual volume 150 (or a logical volume) is typically triggered by a request to open a file on a virtual volume 150, such as a partition or a dynamic volume. For example, an application, such as application 230, may call a function or application programming interface (API) (such as CreateFile in Windows or a kernel-mode driver calls ZwCreateFile or IoCreateFileSpecifyDeviceObjectHint) to open a file. An input/output (I/O) manager 232 may determine which virtual volume 150 is the target of the file open request from the application 230. If the virtual volume 150 has not been mounted by a file system 240 since system boot (for example, the VPB_MOUNTED flag is not set), the I/O manager 232 sends a volume mount request (for example, one or more commands such as I/O request packets (IRP) (for example, IRP_MJ_FILE_SYSTEM_CONTROL and IRP_MN_MOUNT_VOLUME) to file system 238 that might claim the virtual volume 150. The file system 240 may be any one or more file systems 240 and may be any format. For example, server 140 may include one or more of a file allocation table (FAT) formatted file system 240, a new technology file system (NTFS) formatted file system 240, any other formatted file system 240 known to one of ordinary skill in the art, and any combination thereof.

The file system filter driver 236 intercepts the IRP from the I/O Manager 232. The file system filter driver 236 attaches to one or more file system drivers 238 and listens for any such IRPs. The file system filter driver 236 only mounts the virtual volumes 150 that correspond to the partitions selected for redirection. The file system filter driver 236 communicates with agent 224, for example, using named events, to check whether a particular virtual volume 150 should be mounted.

For built-in file systems that are not yet loaded, the I/O manager 232 sends the volume mount request to a file system recognizer 234 (such as FsRec), which checks the volume boot sector on behalf of the built-in file systems. If the file system recognizer 234 determines that a virtual volume 150 was formatted by a not-yet-loaded file system, the I/O Manager 232 responds by sending a load file system to each file system driver (such as the commands IRP_MJ_FILE_SYSTEM_CONTROL AND IRP_MN_LOAD_FILE_SYSTEM) request to the file system recognizer 234 which loads the file system associated with the virtual volume 150. The I/O Manager 232 the sends the original volume mount request from application 230 to the corresponding file system 140. Each file system 240 that receives the mount volume request examines the boot sector of virtual volume 150 to determine whether the format of the virtual volume 150 and other information indicate that the virtual volume 150 was formatted by that particular file system 240. If the format matches, the file system 240 mounts the virtual volume 150.

The virtual volume 150 associated with the selected partitions of USB device 130 then functions as if the USB device 130 was locally connected to server 140 (as indicated by the dashed line between USB device 130 and virtual volume 150). A real driver 226 is loaded for each virtual volume 150.

The virtual volume 150 corresponding to the one or more selected partitions of USB device 130 is then made available to an application 230 via real driver 226. Application 230 may be one or more applications that reside locally at the server 140, may be one or more virtual applications, or any combination thereof. In one or more embodiments application 230 may be any application accessible via websocket 240 to a client 120.

Figure 3:
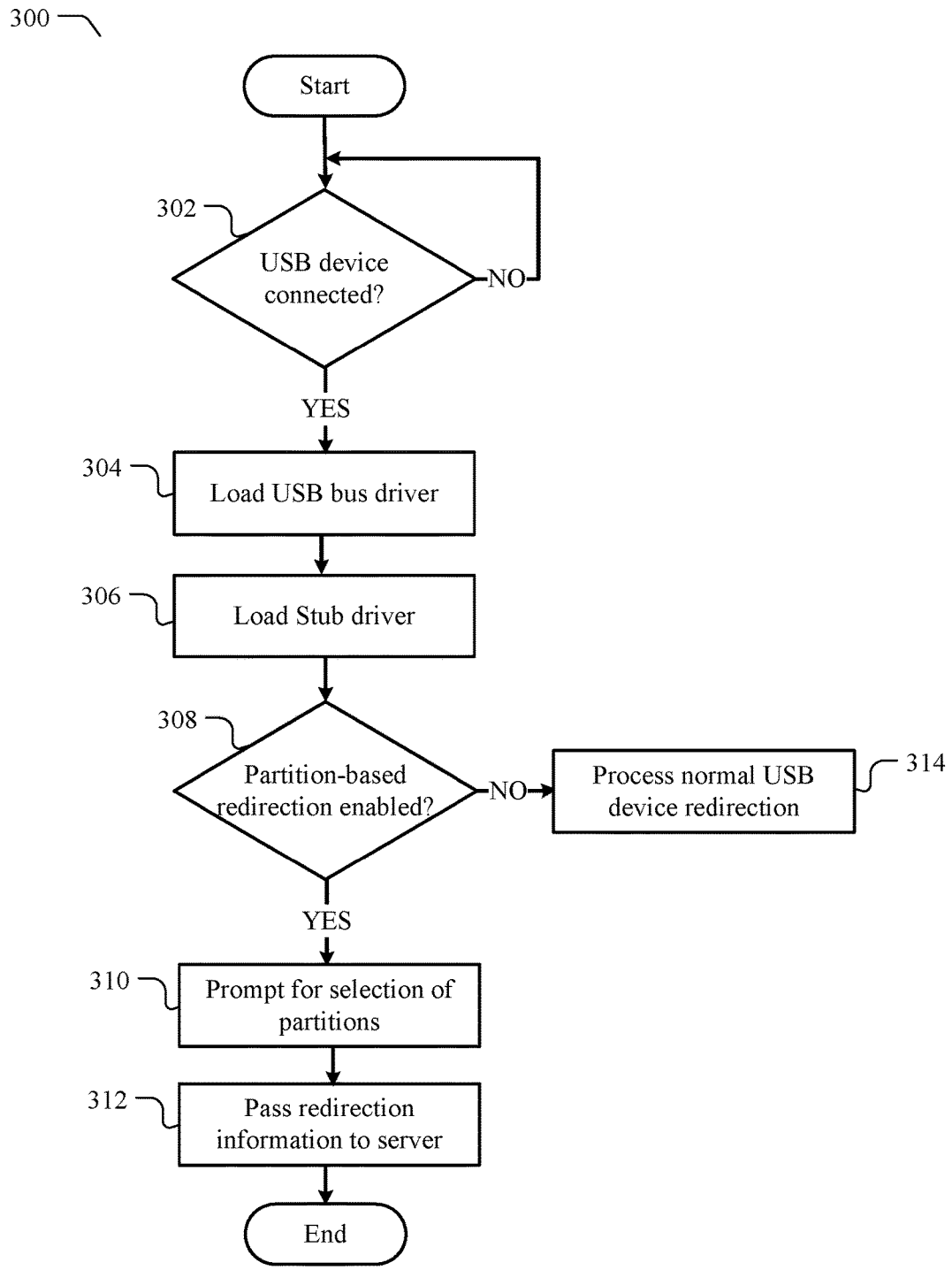
FIG. 3 is a flowchart illustrating an exemplary method for partition-based redirection of USB devices according to one or more embodiments of the present disclosure.

FIG. 3 is a flow chart in accordance with an embodiment of the present disclosure, shown generally at 300, relating to redirection of one or more selected partitions of one or more selected USB devices 130.

At step 302, the client 120, via proxy client 206, polls to determine if a USB device 130 is connected to client 120. In one embodiment, the proxy client 206 registers with the operating system (OS) at the client 120 for a device arrival notification of the type associated with the USB device 130. Proxy client 206 may determine if a USB device 130 is connected by any process known to one of ordinary skill in the art. For example, in one embodiment a user may use a graphical user interface (GUI) or a command line interface (CLI) to inform the client 120 that a USB device 130 has been connected. In another embodiment, the client 120 may automatically detect without user intervention the connection of a USB device 130. USB device 130 may be any known USB device including, but not limited to, a USB mass storage device, a USB thumb drive, a USB hard disk drive, a USB printer, a USB facsimile machine, or any other USB device known to one of ordinary skill in the art that may be coupled to the client 120 via a USB. Client 120 may poll for a connection in any way known to one of ordinary skill in the art, based, at least in part, on an interrupt, a timer, a semaphore, execution of one or more modules comprising one or more instructions etc. that indicates connection of a USB device such as USB device 130. Once the USB device 130 is connected to the client 120, the OS of the client 120 will notify the proxy client 206 with the device type information.

If a USB device 130 is connected (either directly or communicatively) to the client 120, then at step 304, the client 120, via proxy client 206, loads a USB stub driver 208 associated with the USB device 130. At step 306, the USB stub driver 208 loads an associated bus driver 210.

At step 308, the client 120 determines if partition-based redirection is enabled for the client 120. Partition-based redirection may be enabled by setting any one or more partition-based redirection enabled parameters. For example, at step 308 the determination of whether partition-based redirection is enabled may be based, at least in part, on value of a system registry setting, a variable, a predetermined memory location, a database entry, a memory register, a user profile setting, a client 120 profile setting, any other value known to one of ordinary skill in the art, and any combination thereof. If it is determined at step 308 that partition-based redirection is not enabled then the process continues at step 314 with redirection of the USB device 130 in any way known to one of ordinary skill in the art.

The determination at step 308 may occur at boot-up of client 120, each time a user logs-in to the client 120 or the server 140, each time a connection is established between client 120 and server 140, each time a new USB device 130 is coupled to a client 120, each time a partition-based redirection parameter is changed, at the occurrence any other event known to one of ordinary skill in the art, or any combination thereof.

If, at step 308, it is determined that partition-based redirection is enabled, then at step 310 a prompt is given for selection of one or more partitions of USB device 130 for redirection. In one embodiment, the prompt may be made via UI 202. A user may be presented with the available partitions of USB device 130. The user may select one or more partitions for redirection. In one embodiment, the UI 202 presents the user with a selection of partitions via a CLI, a GUI, any way known to one of ordinary skill in the art or any combination thereof. In one embodiment, the user may be presented with one or more USB devices 130 to select for redirection and may be presented with one or more partitions for selection where the one or more partitions are associated with each of the one or more USB devices 130. For example, client 120 may have the three USB devices 130 ("A", "B", and "C") coupled to the client 120. Device "A" may have two partitions, device "B" may have three partitions and device "C" may have four partitions. The user may be presented with all three devices ("A", "B" and "C") or any combination of devices. For example, client 120 may have one or more partition-based redirection parameters that allow (for example, at step 308) any one or more of the devices "A", "B", and "C" to be redirected. In one example, only devices "B" and "C" meet the requirements of the partition-based redirection parameters and thus only devices "B" and "C" are presented to, for example, a user, for selection. In one embodiment, all of the partitions of devices "B" and "C" are presented for selection. In another embodiment, only certain partitions are presented for selection. For example, a first partition of device "B" may be locked or secured and thus may not be presented as a partition that may be selected for redirection while all of the partitions associated with device "C" may be presented for selection. Any one or more other partition selection parameters may determine whether a partition is presented for selection. For example, the one or more selection parameters may also include size of the partition, one or more security parameters associated with the partition, number of partitions (for example, a maximum or minimum number of partitions threshold may be set), or any other partition parameter known to one of ordinary skill in the art. Whether a partition of any given USB device 130 is presented may be based, at least in part, on any one or more of the partition parameters.

Once the selection of the one or more partitions associated with the one or more selected USB devices 130 is made, the redirection information for each USB device 130 selected is passed to the server 140. For example, the redirection information is passed from the proxy client 206 of the client 120 to the agent 224 of the server 140 during read and write channel establishment. The redirection information may include any one or more of the notification that USB device 130 needs to be redirected, one or more properties associated with the selected USB device 130, the identification of the one or more selected partitions, one or more properties associated with the one or more selected partitions, any other redirection information known to one of ordinary skill in the art, and any combination thereof.

In one or more embodiment, the server 140 may communicate whether or not a virtual USB device 150 corresponding to the selected USB device 130 was successfully created.

Figure 4:
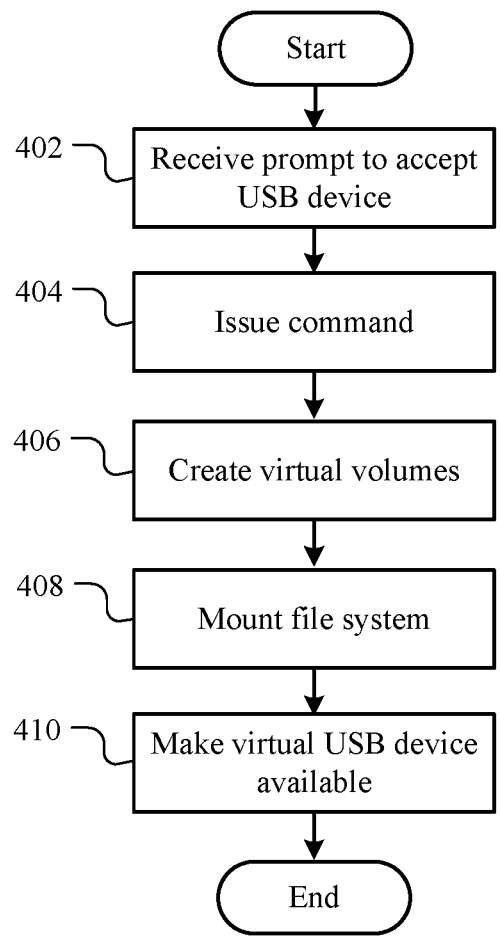
FIG. 4 is a flowchart illustrating an exemplary method for partition-based redirection of USB devices according to one or more embodiments of the present disclosure.

FIG. 4 is a flow chart in accordance with one embodiment of the present invention shown generally at 400. At step 402, the server 140 receives a notification from a client 120 that one or more selected partitions of a selected USB device 130 are ready for virtualization. The notification may include redirection information associated with the one or more selected partitions of the selected USB device 130. The notification is sent from the proxy client 206 to the agent 224. In one embodiment, the notification is a USB device 130 arrival notification. In one embodiment, the notification may prompt the server 140 to accept redirection of the one or more selected partitions of the selected USB device 130.

At step 404, the agent 224 issues a command to a virtual disk enumerator (not shown) to create a virtual volume 150 corresponding to USB device 130. The virtual volume 150 may be created based, at least in part, on any of the redirection information associated with the notification.

At step 406, one or more virtual volumes 150 associated with each of the selected partitions as identified in the received redirection information is created. Virtual volumes 150 are created for only the selected partitions. For example, the file system filter driver 236 may intercept one or more IRPs from the I/O manager 232. The file system filter driver 236 waits for the IRPs and mounts only the virtual volumes 150 associated with a selected partition.

At step 408, a file system 240 is mounted associated with each of the virtual volumes 150 created for each of the selected partitions. The file system filter driver 236 will communicate with the agent 224, for example, using one or more named events, to determine whether a particular volume should be mounted and if so, the file system 240 is mounted for each corresponding virtual volume 150.

At step 410, the virtual volume 150 is made available for access by one or more applications 230. The virtual volume 150 may notify the operating system of the server 140 that the virtual volume 150 has arrived. The operating system builds an associated driver stack and will identify and load the required real drivers 226 for the virtual volume 150. The server 140 may, in one embodiment, notify the client 120 that the virtual volume 150 corresponding to the selected USB device 130 was successfully created.

Figure 5:
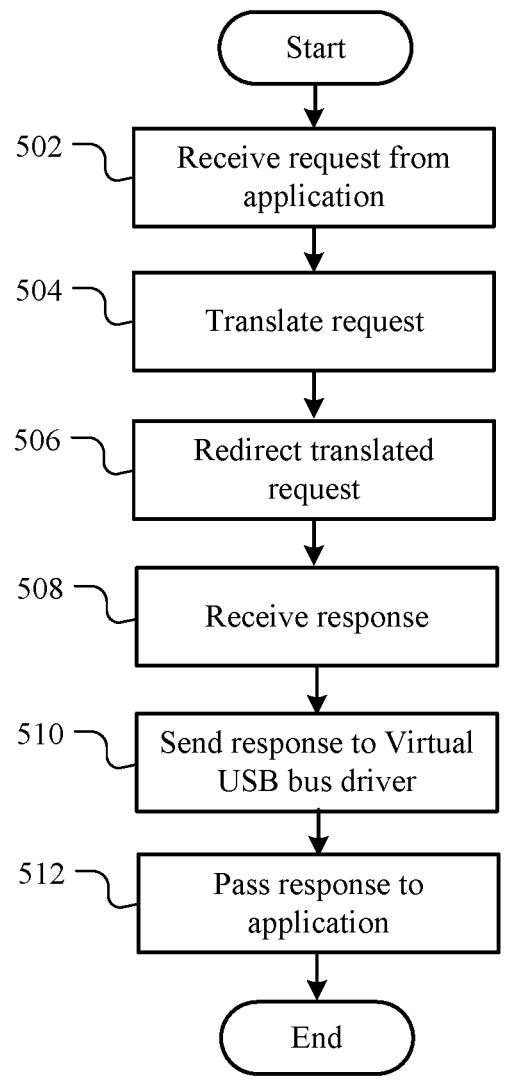
FIG. 5 is a flowchart illustrating an exemplary method for partition-based redirection of USB devices according to one or more embodiments of the present invention.

FIG. 5 is a flow chart in accordance with one embodiment of the present invention shown generally at 500. At step 502, server 140 receives a request from an application 230 to access a specific redirected partition of virtual volume 150. In one embodiment, the application 230 is local to the server while in another embodiment application 230 is a virtual application. In a particular embodiment, the request is associated with input to or data accessed by the application 230.

At step 504, the server 140 translates the request from the application 230 to a USB request block (URB) directed to the virtual volume 150. At step 506, the virtual USB bus driver 228 redirects the URB via agent 224 to the client 120 associated with the USB device 130 corresponding to the virtual volume 150. At the client 120, the URB is received by the proxy client 106 and passed to the USB device 130 via stub driver 208 and USB bus driver 210. At step 504, the server 140 may also determine whether the request is to a selected partition that comprises secure data. If so, the server 140 may determine if the requesting application 230 has permission to access the secure data. The determination may be based, at least in part, on one or more security permissions stored at the server 140. For example, certain applications 230 may be given security permissions that allow access to any type of data, any partition, or any combination thereof while other applications 230 may assigned a specific level of security permissions and may only be permitted to access data from a selected partition that falls within the associated security permission. Likewise, the server 140 may determine whether a particular user has the required security permissions to access data associated with a selected partition. For example, the request may identify the user of the application 230 requesting access to the data and the server may determine based, at least in part, on the security permissions associated with the user, the application 230, or any combination thereof whether the request should be further processed or whether the request should be denied.

At step 508, the server 140 via agent 224 receives the response associated with the URB from the client 120 via proxy client 206. At step 510, the response is sent to the virtual USB bus driver 228. At step 512 the virtual USB bus driver 228 passes the response to the requesting application 230 via the real driver 226 associated with the virtual volume 150 of the original request.

Figure 6:
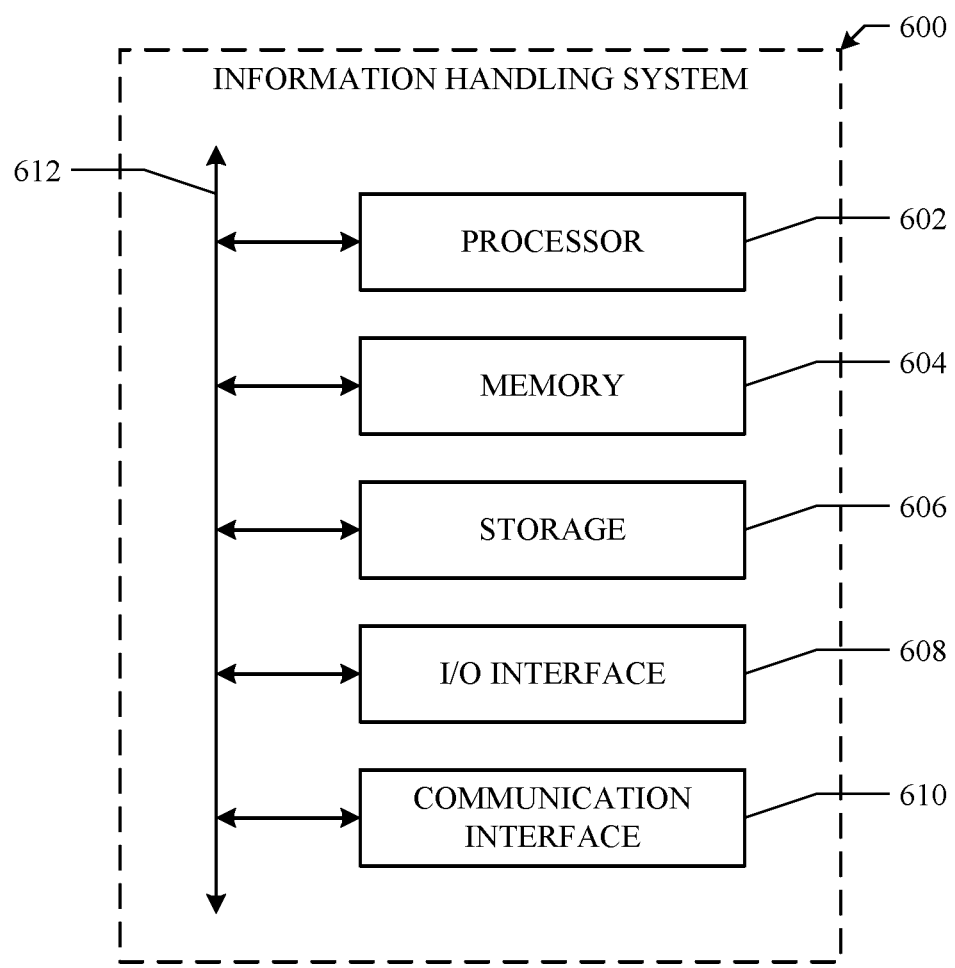
FIG. 6 is a conceptual block diagram illustrating selected elements of an information handling system according to one embodiment of the present disclosure.

Particular embodiments may be implemented on one or more electronic devices or information handling systems. FIG. 6 illustrates an example information handling system, computer system 600. For example, computer system 600 may be an embodiment for a device that runs a user interface content editor. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600.

This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an I/O interface 608, a communication interface 610, and a bus 612.

Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. The instructions may be part of one or more modules. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard-disk drive (HDD), a floppy disk drive, flash memory, an optical disc, a magneto-optical disc, magnetic tape, or a USB drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving redirection information from a client, wherein the redirection information comprises one or more selected partitions of a universal serial bus (USB) device coupled to the client;
   sending one or more volume mount requests from an input/output (I/O) manager to one or more file system drivers;
   attaching to one or more of the one or more file system drivers;
   intercepting the one or more volume mount requests by a file system filter driver;
   identifying by the file system filter driver one or more virtual volumes corresponding to the selected partitions of the USB device; and
   mounting the one or more file systems corresponding to each of the one or more identified virtual volumes.

2. The method of claim 1, further comprising:
   receiving a request to access a first virtual volume associated with the virtual USB device.

3. The method of claim 1, wherein the redirection information comprises one or more of a notification, one or more properties associated with the one or more selected partitions, and identification of the one or more selected partitions.

4. The method of claim 1, wherein a virtual disk enumerator creates the virtual USB device.

5. The method of claim 1, further comprising:
notifying the client that the virtual USB device was successfully created.

6. The method of claim 1, further comprising:
receiving a request from an application, wherein the request is directed to a specific virtual volume;
translating the request to a USB request block; and
passing the USB request block to the client.

7. The method of claim 1, further comprising:
determining if one or more of the one or more selected partitions comprises secure data;
determining if an application associated with a request has permission to access the one or more selected partitions comprising secure data; and
processing the request based, at least in part, on one or more security permissions associated with the application.

8. One or more computer-readable non-transitory storage media embodying software that is operable when executed to:
receive redirection information from a client, wherein the redirection information comprises one or more selected partitions of a universal serial bus (USB) device coupled to the client;
send one or more volume mount requests from an input/output (I/O) manager to one or more file system drivers;
attach to one or more of the one or more file system drivers;
intercept the one or more volume mount requests by a file system filter driver;
identify by the file system filter driver one or more virtual volumes corresponding to the selected partitions of the USB device; and
mount the one or more file systems corresponding to each of the one or more identified virtual volumes.

9. The media of claim 8, wherein the software when executed is further operable to:
receive a request to access a first virtual volume associated with the virtual USB device.

10. The media of claim 8, wherein the redirection information comprises one or more of a notification, one or more properties associated with the one or more selected partitions, and identification of the one or more selected partitions.

11. The media of claim 8, wherein a virtual disk enumerator creates the virtual USB device.

12. The media of claim 8, wherein the software when executed is further operable to:
notify the client that the virtual USB device was successfully created.

13. The media of claim 8, wherein the software when executed is further operable to:
receive a request from an application, wherein the request is directed to a specific virtual volume;
translate the request to a USB request block; and
pass the USB request block to the client.

14. A system comprising:
one or more processors; and
a memory coupled to the processors comprising instructions executable by the processors, the processors being operable when executing the instructions to:
receive redirection information from a client, wherein the redirection information comprises one or more selected partitions of a universal serial bus (USB) device coupled to the client;
send one or more volume mount requests from an input/output (I/O) manager to one or more file system drivers;
attach to one or more of the one or more file system drivers;
intercept the one or more volume mount requests by a file system filter driver;
identify by the file system filter driver one or more virtual volumes corresponding to the selected partitions of the USB device; and
mount the one or more file systems corresponding to each of the one or more identified virtual volumes.

15. The system of claim 14, wherein the processors are further operable when executing instructions to:
receive a request to access a first virtual volume associated with the virtual USB device.

16. The system of claim 14, wherein the redirection information comprises one or more of a notification, one or more properties associated with the one or more selected partitions, and identification of the one or more selected partitions.

17. The system of claim 14, wherein a virtual disk enumerator creates the virtual USB device.

18. The system of claim 14, wherein the processors are further operable when executing instructions to:
notify the client that the virtual USB device was successfully created.

19. The system of claim 14, wherein the processors are further operable when executing instructions to:
receive a request from an application, wherein the request is directed to a specific virtual volume;
translate the request to a USB request block; and
pass the USB request block to the client.

20. The system of claim 14, wherein the processors are further operable when executing instructions to:
determine if one or more of the one or more selected partitions comprises secure data;
determine if an application associated with a request has permission to access the one or more selected partitions comprising secure data; and
process the request based, at least in part, on one or more security permissions associated with the application.

* * * * *